United States Patent
Matsuno et al.

(10) Patent No.: US 12,242,278 B2
(45) Date of Patent: Mar. 4, 2025

(54) LOCALIZATION SYSTEM, LOCALIZATION METHOD, STORAGE MEDIUM, AND MAP GENERATION DEVICE

(71) Applicant: TOYOTA JIDOSHA KABUSHIKI KAISHA, Toyota (JP)

(72) Inventors: Nobuyuki Matsuno, Tokyo (JP); Fukukazu Kawata, Nagoya (JP); Kazuhito Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 18/075,896

(22) Filed: Dec. 6, 2022

(65) Prior Publication Data
US 2023/0185310 A1 Jun. 15, 2023

(30) Foreign Application Priority Data
Dec. 13, 2021 (JP) .................. 2021-201874

(51) Int. Cl.
*G05D 1/00* (2024.01)
*G06T 7/579* (2017.01)

(52) U.S. Cl.
CPC ......... *G05D 1/0274* (2013.01); *G05D 1/0246* (2013.01); *G06T 7/579* (2017.01)

(58) Field of Classification Search
CPC .... G05D 1/0274; G05D 1/0246; G06T 7/579; G01C 21/387
See application file for complete search history.

(56) References Cited

U.S. PATENT DOCUMENTS

2019/0278289 A1  9/2019  Nakajima
2021/0343087 A1* 11/2021 Gomez Gonzalez ... G06F 3/013
2022/0180609 A1* 6/2022 Huang .................... G06T 17/05

FOREIGN PATENT DOCUMENTS

JP          2019-159520 A       9/2019

* cited by examiner

Primary Examiner — Hussein Elchanti
Assistant Examiner — Micah Chuen-Him Cheng
(74) Attorney, Agent, or Firm — Dinsmore & Shohl LLP (57) ABSTRACT

A localization system includes: a first data acquisition unit that acquires map data for map creation in a plurality of different time zones; a candidate creation unit that creates the maps based on the map data acquired by the first data acquisition unit, and combines the created maps to create a plurality of synthetic map candidates; a performance calculation unit that calculates a performance value of each of the synthetic map candidates created by the candidate creation unit; a candidate selection unit that selects one synthetic map candidate from among the plurality of synthetic map candidates based on the performance value of the synthetic map candidate calculated by the performance calculation unit; and a localization unit that performs localization of a mobile body based on the synthetic map candidate selected by the candidate selection unit.

12 Claims, 7 Drawing Sheets

|  | MAP i | MAP j | MAP i + MAP j |
|---|---|---|---|
| TIME ZONE DATA 1 | $r_{1i}\%$ | $r_{1j}\%$ | $max(r_{1i}, r_{1j})\%$ |
| TIME ZONE DATA 2 | $r_{2i}\%$ | $r_{2j}\%$ | $max(r_{2i}, r_{2j})\%$ |
| ⋮ | ⋮ | ⋮ | ⋮ |
| TIME ZONE DATA N | $r_{Ni}\%$ | $r_{Nj}\%$ | $max(r_{Ni}, r_{Nj})\%$ |

FIG. 6

|  | MAP 1 | MAP 2 | SYNTHETIC MAP CANDIDATE (MAP 1 + MAP 2) |
|---|---|---|---|
| TIME ZONE DATA 1 | 60% | 90% | 90% |
| TIME ZONE DATA 2 | 85% | 40% | 85% |
| TIME ZONE DATA 3 | 70% | 80% | 80% |
| TIME ZONE DATA 4 | 70% | 75% | 75% |
| AVERAGE TRACKING RATE |  |  | 82.50% |

| | 7:48 | 8:55 | 10:07 | 11:25 | 13:59 | 16:29 | 18:09 | 19:26 |
|---|---|---|---|---|---|---|---|---|
| MAP 1 (MEASURED FROM 8:00 AM TO 8:59 AM) | 0.15 | 0.17 | 0.17 | 0.18 | 0.48 | 0.27 | 2.65 | 1.02 |
| MAP 2 (MEASURED FROM 5:00 PM TO 5:59 PM) | 1.70 | 3.21 | 1.73 | 2.09 | 0.13 | 0.14 | 0.16 | 0.16 |
| SYNTHETIC MAP (MAP 1 + MAP 2) | 0.16 | 0.18 | 0.18 | 0.21 | 0.14 | 0.14 | 0.16 | 0.19 |

LOCALIZATION SYSTEM, LOCALIZATION METHOD, STORAGE MEDIUM, AND MAP GENERATION DEVICE

CROSS-REFERENCE TO RELATED APPLICATION

This application claims priority to Japanese Patent Application No. 2021-201874 filed on Dec. 13, 2021, incorporated herein by reference in its entirety.

BACKGROUND

1. Technical Field

The present disclosure relates to a localization system, a localization method, a storage medium, and a map generation device that estimates the self location of a mobile body.

2. Description of Related Art

A localization system is known, in which environmental information is linked in advance to a plurality of maps, a map linked with the environmental information close to the current environmental information is selected from among the plurality of maps, and localization of the mobile body is performed based on the selected map (see, for example, Japanese Unexamined Patent Application Publication No. 2019-159520 (JP 2019-159520 A)).

SUMMARY

In the localization system described above, depending on the environment, it may be difficult to predict an influence of environmental information on map accuracy, making it difficult to select the environmental information to be linked. For this reason, depending on the selected environmental information, there is a possibility that the accuracy of localization may be lowered.

The present disclosure has been made in view of such problems, and a main object to provide a localization system, a localization method, a storage medium, and a map generation device that can improve the accuracy of localization.

One aspect of the present disclosure for achieving the above object is a localization system including: a first data acquisition unit that acquires map data for map creation in a plurality of different time zones; a candidate creation unit that creates maps based on the map data acquired by the first data acquisition unit, and combines the created maps to create a plurality of synthetic map candidates; a performance calculation unit that calculates a performance value of each of the synthetic map candidates created by the candidate creation unit; a candidate selection unit that selects one synthetic map candidate from among the plurality of synthetic map candidates based on the performance value of the synthetic map candidate calculated by the performance calculation unit; and a localization unit that performs localization of a mobile body based on the synthetic map candidate selected by the candidate selection unit. In this aspect, (1) the candidate creation unit may create the plurality of synthetic map candidates by combining N number of maps at a time; (2) the performance calculation unit may calculate the performance value of each of the synthetic map candidates created by the candidate creation unit; (3) the candidate selection unit may select a synthetic map candidate having the highest performance value from among the plurality of created synthetic map candidates, and determine whether the performance value of the selected synthetic map candidate is equal to or less than a predetermined value; when the candidate selection unit determines that the performance value of the synthetic map candidate is equal to or less than the predetermined value, N=N+1 may be obtained; the candidate creation unit, the performance calculation unit, and the candidate selection unit may repeat the processes (1), (2), and (3), respectively; and when the candidate selection unit determines that the performance value of the synthetic map candidate is greater than the predetermined value, the candidate selection unit may synthesize the maps of the synthetic map candidate, and output the synthesized synthetic map candidate to the localization unit. In this aspect, the performance calculation unit may calculate the performance values of the synthetic map candidates for each of the time zones, and calculate an average value of the calculated performance values, and the candidate selection unit may select one synthetic map candidate from among the plurality of synthetic map candidates based on the average value of the performance values of the synthetic map candidates calculated by the performance calculation unit. In this aspect, the performance calculation unit may calculate the average value of the performance values by multiplying the performance value for a predetermined time zone among the performance values of the synthetic map candidates for each of the time zones by a weighting factor. In this aspect, the performance calculation unit may set a better one of performance values of the maps to be combined when creating the synthetic map candidate, as the performance value of the synthetic map candidate. In this aspect, the performance calculation unit may calculate a self location tracking rate or a localization accuracy during movement of the mobile body, as the performance value of each of the map candidates. In this aspect, the first data acquisition unit may acquire the map data for map creation in a plurality of different time zones and locations. In this aspect, a second data acquisition unit that acquires performance data for calculating the performance value may be further included, and the performance calculation unit may calculate the performance value of each of the map candidates based on the performance data acquired by the second data acquisition unit. One aspect of the present disclosure for achieving the above object may be a localization method including: a step of acquiring map data for map creation in a plurality of different time zones; a step of creating maps based on the map data, and combining the created maps to create a plurality of synthetic map candidates; a step of calculating a performance value of each of the created synthetic map candidates; a step of selecting one synthetic map candidate from among the plurality of synthetic map candidates based on the calculated performance value of the synthetic map candidate; and a step of performing localization of a mobile body based on the selected synthetic map candidate. One aspect of the present disclosure to achieve the above object may be a storage medium that stores a program that causes a computer to execute: a process of acquiring map data for map creation in a plurality of different time zones; a process of creating maps based on the acquired map data, and combining the created maps to create a plurality of synthetic map candidates; a process of calculating a performance value of each of the created synthetic map candidates; a process of selecting one synthetic map candidate from among the plurality of synthetic map candidates based on the calculated performance value of the synthetic map candidate; and a process of performing localization of a mobile body based on the selected synthetic map candidate.

One aspect of the present disclosure for achieving the above object may be a map generation device including: a first data acquisition unit that acquires map data for map creation in a plurality of different time zones; a candidate creation unit that creates maps based on the map data acquired by the first data acquisition unit, and combines the created maps to create a plurality of synthetic map candidates; a performance calculation unit that calculates a performance value of each of the synthetic map candidates created by the candidate creation unit; and a candidate selection unit that selects one synthetic map candidate from among the plurality of synthetic map candidates based on the performance value of the synthetic map candidate calculated by the performance calculation unit.

According to the present disclosure, it is possible to provide a localization system, a localization method, a storage medium, and a map generation device that can improve the accuracy of localization.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
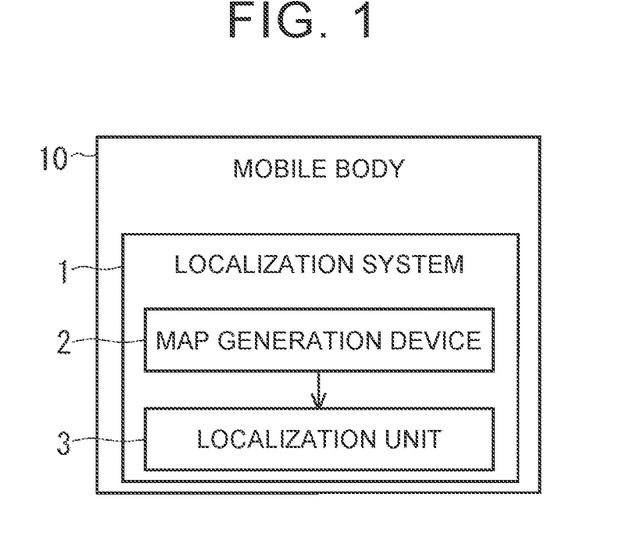
FIG. 1 is a block diagram showing a schematic system configuration of a localization system according to the present embodiment.
Figure 2:
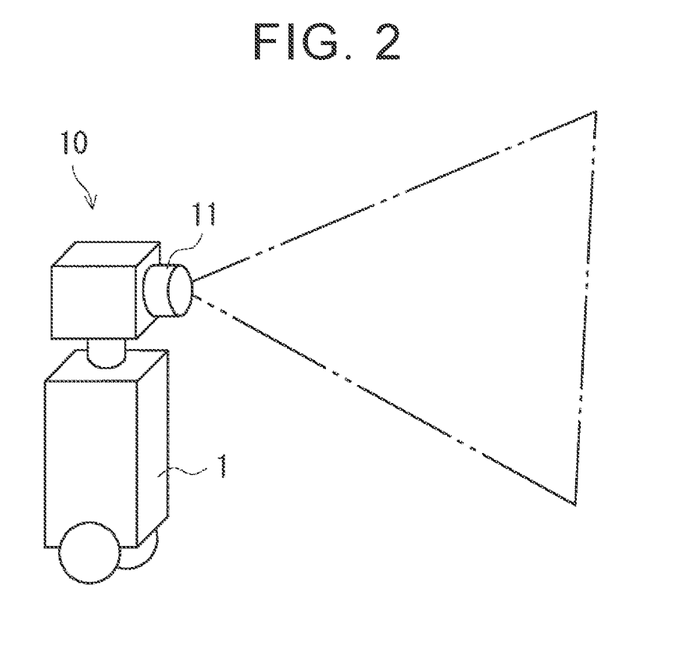
FIG. 2 is a diagram showing a mobile body according to the present embodiment.

Hereinafter, the present embodiments will be described with reference to the drawings. FIG. 1 is a block diagram showing a schematic system configuration of a localization system according to the present embodiment. FIG. 2 is a diagram showing a mobile body according to the present embodiment.

A localization system 1 according to the present embodiment may be mounted on a mobile body 10 as shown in FIG. 2. The mobile body 10 is configured as, for example, an autonomous mobile robot that moves autonomously. The localization system 1 performs localization based on sensor information detected by a sensor 11 such as a camera.

As shown in FIG. 1, the localization system 1 includes a map generation device 2 that generates an environment map, and a localization unit 3 that estimates the self location based on the environment map.

The localization system 1 has a hardware configuration of a normal computer including, for example, processors such as a central processing unit (CPU) and a graphics processing unit (GPU), internal memories such as a random access memory (RAM) and a read only memory (ROM), a storage device such as a hard disk drive (HDD) and a solid state drive (SDD), an input/output interface (I/F) for connecting peripheral devices such as a display, and a communication I/F for communicating with devices outside the device.

The map generation device 2 and the localization unit 3 are configured to be mounted on the mobile body 10, but are not limited to this. At least one of the map generation device 2 and the localization unit 3 may be provided outside the mobile body 10.

Figure 3:
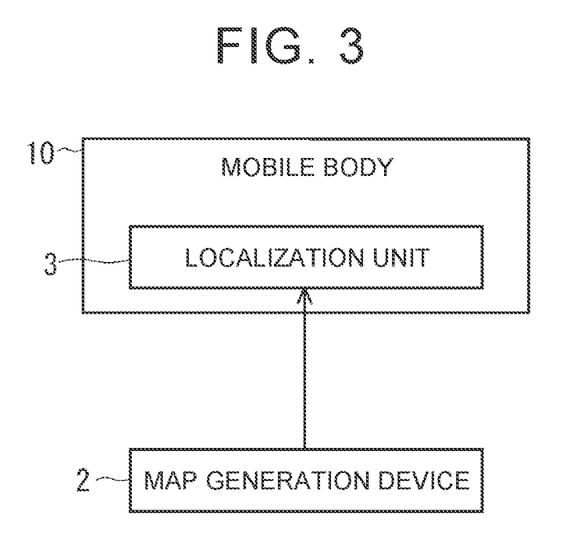
FIG. 3 is a diagram showing a configuration in which a localization unit is provided in the mobile body and a map generation device is provided outside the mobile body.

For example, as shown in FIG. 3, the localization unit 3 may be provided in the mobile body 10, and the map generation device 2 may be provided in a place other than the mobile body 10. In this case, the map generation device 2 may transmit the generated environment map to the localization unit 3 of the mobile body 10 using wireless communication or the like.

The map generation device 2 according to the present embodiment generates a synthetic map candidate as an environment map offline, as will be described later. Note that the map generation device 2 may generate a synthetic map candidate as an environment map online.

The localization system 1 according to the present embodiment generates a map corresponding to changes in sunshine conditions depending on the time of day, and performs more accurate localization based on the generated map. For this reason, as will be described later, the localization system 1 selects a combination of maps with the best performance such as a tracking rate among the combinations of maps created in different time zones, and synthesizes the selected combined maps.

As a result, it is possible to generate a highly accurate map corresponding to changes in sunshine conditions depending on the time, and it is possible to perform more highly accurate localization based on the generated map.

Figure 4:
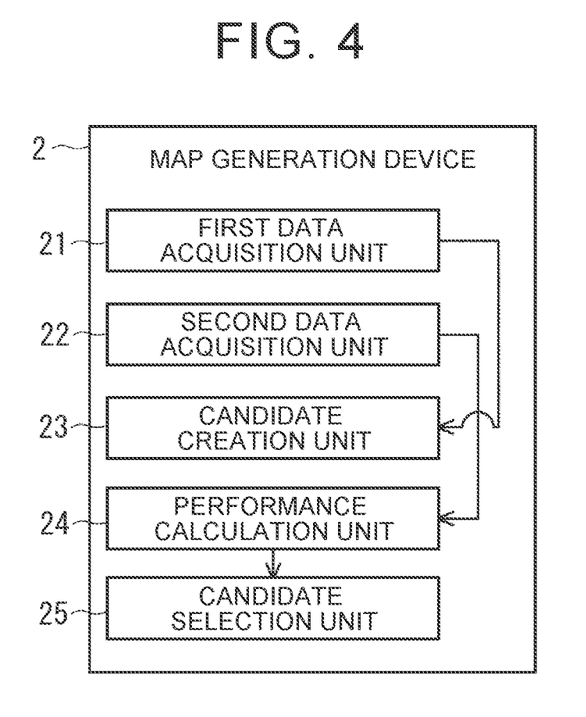
FIG. 4 is a block diagram showing a schematic system configuration of the map generation device according to the present embodiment.

FIG. 4 is a block diagram showing a schematic system configuration of the map generation device according to the present embodiment. The map generation device 2 according to this embodiment includes a first data acquisition unit 21 that acquires map data, a second data acquisition unit 22 that acquires performance data, a candidate creation unit 23 that creates a synthetic map candidate, a performance calculation unit 24 that calculates a performance value of the synthetic map candidate, and a candidate selection unit 25 that selects the synthetic map candidate.

The first data acquisition unit 21 is a specific example of first data acquisition unit. The first data acquisition unit 21 acquires the map data for map creation in a plurality of different time zones. As a result, it is possible to acquire the map data corresponding to changes in the sunshine conditions depending on the time of day.

The first data acquisition unit 21 acquires the map data in different time zones such as 7:00 to 9:00, 9:00 to 11:00, and 11:00 to 13:00. The first data acquisition unit 21 may acquire the map data for map creation in a plurality of different time zones and locations. As a result, it is possible to acquire the map data that corresponds not only to changes in the sunshine conditions due to the time, but also to changes in the location.

The first data acquisition unit 21 may acquire map data pre-stored in a storage device (storage medium) or the like. Further, the map data may be input to the first data acquisition unit 21 by a user or the like, or may be stored in the first data acquisition unit 21 in advance. The first data acquisition unit 21 outputs the acquired map data to the candidate creation unit 23.

The second data acquisition unit 22 is a specific example of second data acquisition unit. The second data acquisition unit 22 acquires the performance data for calculating the performance values of the synthetic map candidates, such as the tracking rates and location errors, which will be described later. The second data acquisition unit 22 acquires, for example, the performance data in different time zones (time zone data 1, time zone data 2, and so on).

The second data acquisition unit 22 may acquire the performance data pre-stored in a storage device or the like. Also, the performance data may be input to the second data acquisition unit 22 by the user, or may be stored in the second data acquisition unit 22 in advance. The second data acquisition unit 22 outputs the acquired performance data to the performance calculation unit 24.

The candidate creation unit 23 is a specific example of candidate creation unit. The candidate creation unit 23 creates maps based on the map data acquired by the first data acquisition unit 21. The candidate creation unit 23 creates a plurality of synthetic map candidates by combining the created maps.

For example, the candidate creation unit 23 creates a map 1, a map 2, a map 3, and so forth, based on map data 1, map data 2, map data 3, and so forth, in different times zones. Then, the candidate creation unit 23 combines the created maps 1 and 2, combines the maps 2 and 3, and so forth, and creates a synthetic map candidate (map 1+map 2) 1, a synthetic map candidate (map 2+map 3) 2, and so forth.

The combination pattern described above is an example, and the candidate creation unit 23 may combine a plurality of maps in any pattern. For example, the candidate creation unit 23 may create a synthetic map candidate by combining three or more maps. The candidate creation unit 23 outputs the created synthetic map candidates to the performance calculation unit 24.

The performance calculation unit 24 is a specific example of a performance calculation unit. The performance calculation unit 24 calculates the performance value of each synthetic map candidate created by the candidate creation unit 23 as a predicted value based on the performance data acquired by the second data acquisition unit 22. The performance calculation unit 24 calculates the self location tracking rate or the localization accuracy during movement of the mobile body 10 as the performance value of each synthetic map candidate, but is not limited to this. The performance calculation unit 24 may calculate other statistics or the like as the performance value of each synthetic map candidate. An example in which the performance value of each synthetic map candidate is the tracking rate of the mobile body 10 will be described below.

The performance calculation unit 24 uses data necessary for calculating the tracking rates in the different time zones (hereinafter referred to as time zone data) as the performance data. The performance calculation unit 24 calculates the tracking rate of the synthetic map candidate for each time zone data.

For example, the performance calculation unit 24 calculates the tracking rate of each map constituting the synthetic map candidate, and sets the higher one of the calculated tracking rates as the tracking rate of the synthetic map candidate. Note that the performance calculation unit 24 may use the average value of the tracking rate for each time zone data of the synthetic map candidate as the tracking rate of the synthetic map candidate.

The performance calculation unit 24 calculates the average value of the tracking rates of the synthetic map candidates for each calculated time zone.

Figure 5:
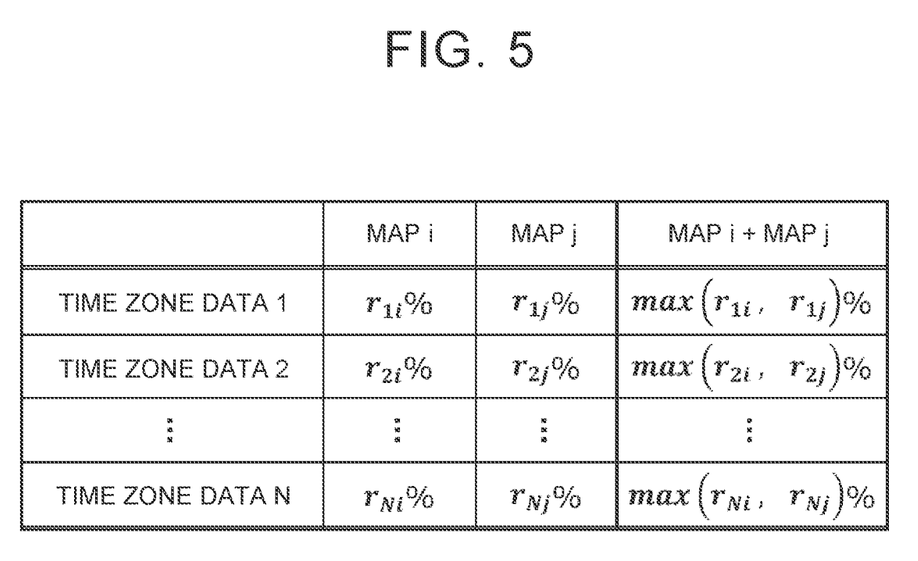
FIG. 5 is a diagram showing a method of calculating an average value of tracking rates of synthetic map candidates obtained by synthesizing a map i and a map j for each of the time zone data 1 to N.

FIG. 5 is a diagram showing a method of calculating the average value of the tracking rate of a synthetic map candidate (map i+map j) acquired by synthesizing the map i and the map j for each time zone data 1 to N.

The performance calculation unit 24 uses the following formula to calculate a map combination $\{i^*, j^*\}$ that maximizes the average tracking rate of the synthetic map candidate (map i+map j) for each of the time zones 1 to N.

[Formula 1]

$$\{i^*, j^*\} = \operatorname*{argmax}_{i,j} \frac{1}{N}\sum_{n=1}^{N} \max(r_{ni}, r_{nj}) \tag{1}$$

The performance calculation unit 24 may use the following formula to multiply the tracking rate for the predetermined time zone data among the tracking rates of the synthetic map candidates for each time zone by a weighting factor $\lambda_n$, and may calculate the map combination $\{i^*, j^*\}$ in which the average value of the tracking rate of the synthetic map candidate becomes the maximum.

[Formula 2]

$$\{i^*, j^*\} = \operatorname*{argmax}_{i,j} \frac{1}{N}\sum_{n=1}^{N} \lambda_n \max(r_{ni}, r_{nj}) \tag{2}$$

For example, there is a case in which it is desired to be able to reliably perform localization during a predetermined time zone such as nighttime. In that case, as described above, the tracking rate for the predetermined time zone is multiplied by the weighting factor to carry out weighting, so that localization can be performed more reliably in the predetermined time zone.

Figure 6:
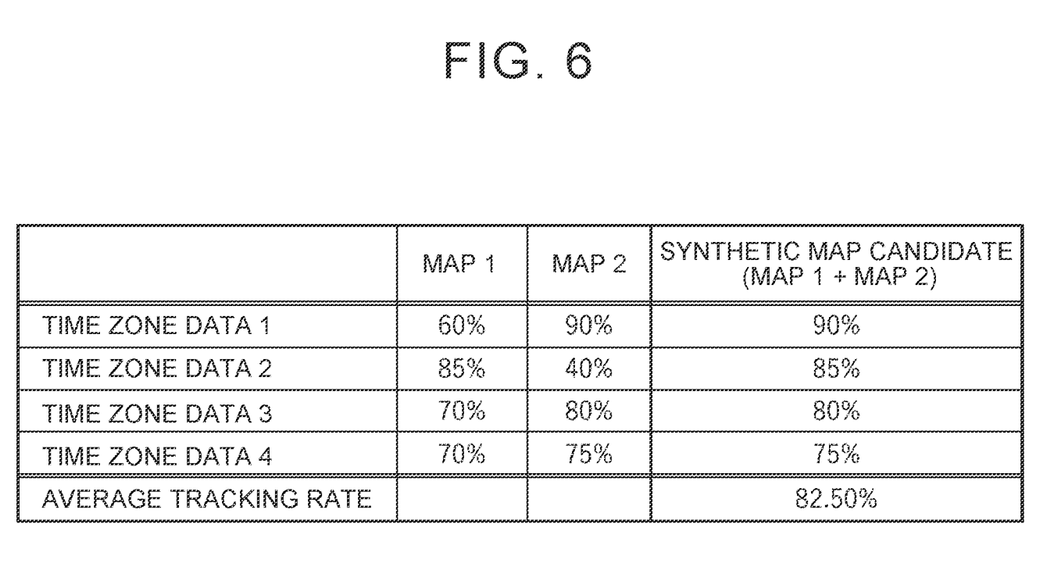
FIG. 6 is a diagram showing a specific example of the method of calculating the average value of tracking rates of the synthetic map candidates obtained by synthesizing maps 1 and 2 for each of the time zones 1 to 4.

FIG. 6 is a diagram showing a specific example of a method of calculating the average value of the tracking rate of the synthetic map candidate (map 1+map 2) obtained by synthesizing maps 1 and 2 for each of the time zone data 1 to 4.

For example, the performance calculation unit 24 calculates the tracking rate of the map 1 as 60% and the tracking rate of the map 2 as 90% for the time zone data 1. The performance calculation unit 24 sets the tracking rate 90% of the map 2, which is the higher one of the calculated tracking rates, as the tracking rate of the synthetic map candidate.

Similarly, the performance calculation unit 24 calculates the tracking rates of 85%, 80%, and 75% of the synthetic map candidates for the time zone data 2 to 4, respectively. The performance calculation unit 24 calculates the average value of the tracking rates of 90%, 85%, 80%, and 75% for the calculated time zone data 1 to 4 as 82.50. The performance calculation unit 24 also calculates the average value of the tracking rates of the other synthetic map candidates (map i+map j) for each of the time zone data 1 to 4 in the same manner as described above.

The candidate selection unit 25 is a specific example of candidate selection unit. The candidate selection unit 25 selects one synthetic map candidate from a plurality of the synthetic map candidates based on the average value of the tracking rates of the synthetic map candidates calculated by the performance calculation unit 24. The candidate selection unit 25 selects, for example, the synthetic map candidate with the highest average tracking rate from among the synthetic map candidates.

The candidate selection unit 25 superimposes the maps constituting the selected synthetic map candidate and synthesizes the maps. Note that the candidate creation unit 23 may synthesize each map of the synthetic map candidate by an arbitrary synthesis method. The candidate selection unit 25 outputs the synthetic map candidate after synthesis to the localization unit 3.

As described above, when the candidate creation unit 23 arbitrarily combines each generated map to generate the synthetic map candidate, as the number of maps to be combined increases, the number of combinations increases and the amount of calculations also increases.

With respect to this, in the present embodiment, the candidate creation unit 23 gradually increases the number of map combinations starting from 2 (N=2), and when the average value of the tracking rates (performance values) of the synthetic map candidates reaches a predetermined value, the candidate selection unit 25 outputs the reached synthetic map candidate to the localization unit 3. As a result, the amount of calculation can be effectively suppressed while performing highly accurate localization based on the synthetic map candidate that satisfies the performance of the predetermined value or more.

Figure 7:
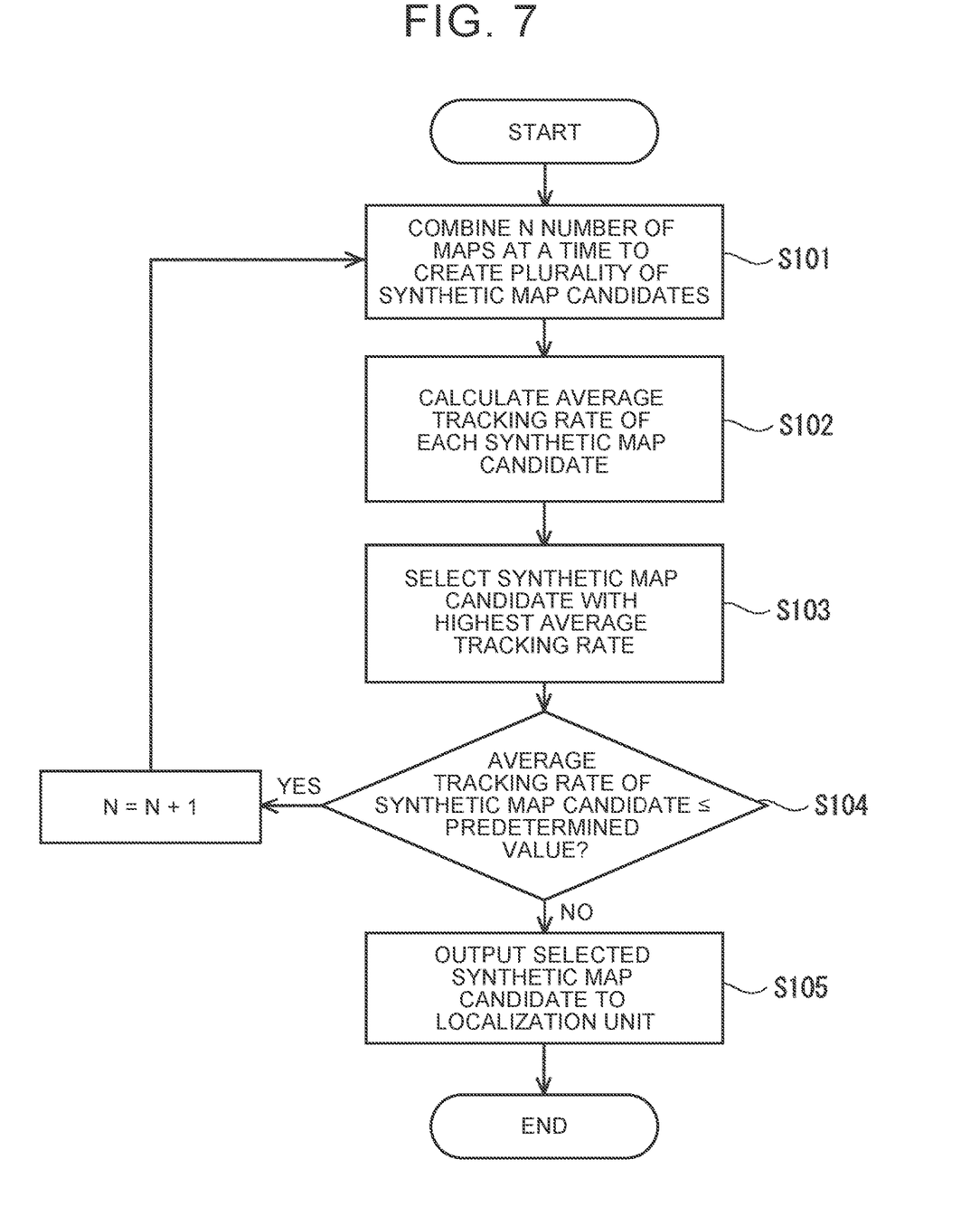
FIG. 7 is a flow chart showing a flow of a synthetic map candidate generating method.

FIG. 7 is a flow chart showing the flow of the synthetic map candidate generating method described above. Assume that the initial value of N is 2 (N=2).

(1) The candidate creation unit 23 creates a plurality of synthetic map candidates by combining N number of maps at a time (step S101).

(2) The performance calculation unit 24 calculates the average value of the tracking rates of each synthetic map candidate created by the candidate creation unit 23 (step S102).

(3) The candidate selection unit 25 selects a synthetic map candidate with the highest average tracking rate from among the plurality of created synthetic map candidates (step S103). The candidate selection unit 25 determines whether the average value of the tracking rates of the selected synthetic map candidates is equal to or less than the predetermined value (step S104).

When the candidate selection unit 25 determines that the average value of the tracking rates of the synthetic map candidates is equal to or less than the predetermined value (YES in step S104), sets N=N+1, and returns to the above-described process (step S101).

On the other hand, when the candidate selection unit 25 determines that the average value of the tracking rates of the synthetic map candidates is greater than the predetermined value (NO in step S104), each map of the selected synthetic map candidates is synthesized, and the synthetic map candidate is output to the localization unit 3 (step S105).

The localization system 1 executes simultaneous localization and mapping (SLAM) for simultaneously generating a map and estimating the self location from sensor information of the mobile body 10, for example. The localization system 1 may use a camera or the like to perform visual simultaneous localization and mapping (VSLAM).

The localization unit 3 is a specific example of localization unit. The localization unit 3 performs localization of the mobile body 10 based on the synthetic map candidate selected by the candidate selection unit 25 of the map generation device 2.

Based on the sensor information of the mobile body 10 and the synthetic map candidate selected by the candidate selection unit 25, the localization unit 3 matches point groups of both data, and calculates a three-dimensional conversion value of the point group location. The localization unit 3 estimates the self location of the mobile body 10 based on the calculated three-dimensional conversion value of the location.

The mobile body 10 moves autonomously based on the self location estimated by the localization unit 3.

Figure 8:
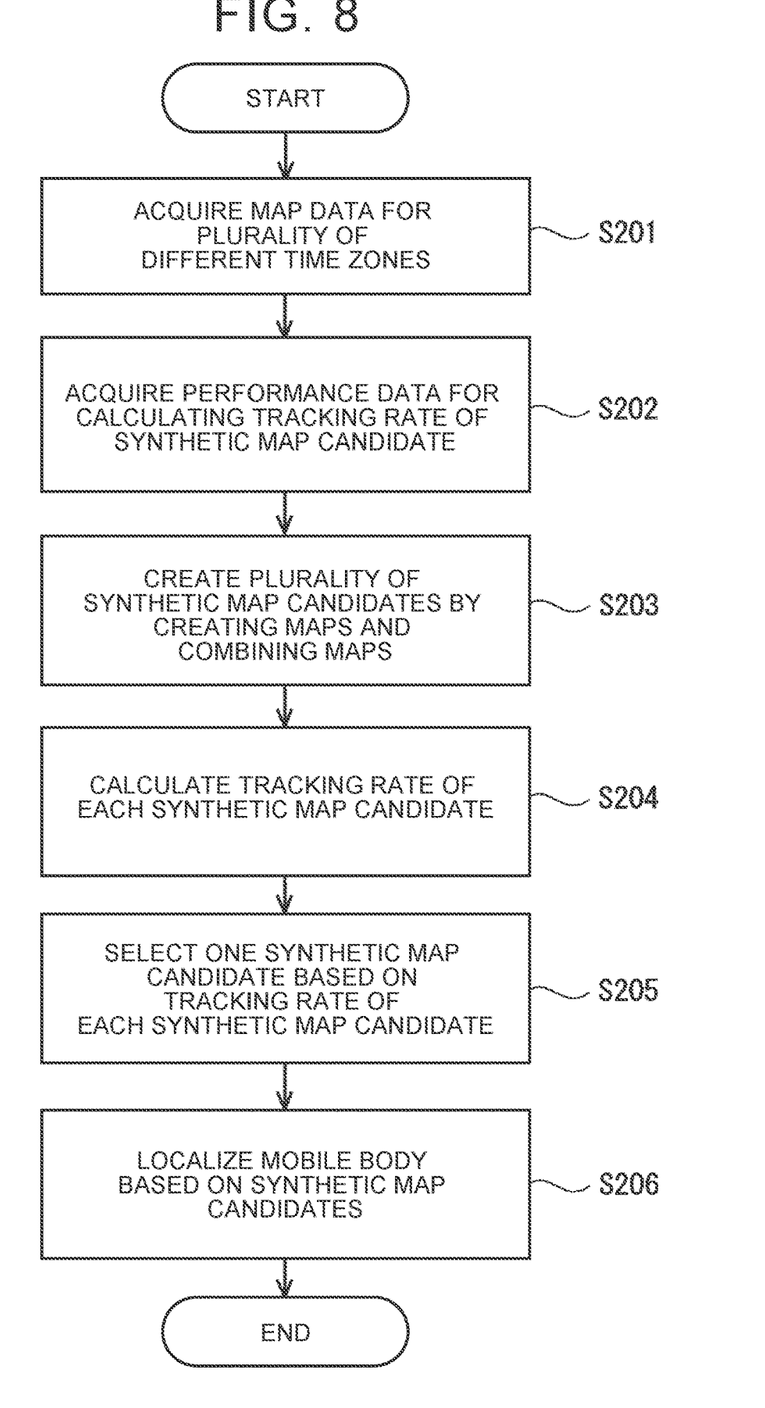
FIG. 8 is a flow chart showing the flow of a localization method according to the present embodiment.

Next, the flow of the localization method according to the present embodiment will be described. FIG. 8 is a flow chart showing the flow of the localization method according to the present embodiment.

The first data acquisition unit 21 acquires the map data for creating maps in the different time zones (step S201).

The second data acquisition unit 22 acquires the performance data for calculating the tracking rate of the synthetic map candidate (step S202).

The candidate creation unit 23 creates the maps based on the map data acquired by the first data acquisition unit 21, and combines the created maps to create the synthetic map candidates (step S203).

The performance calculation unit 24 calculates the tracking rate of each synthetic map candidate created by the candidate creation unit 23 based on the performance data acquired by the second data acquisition unit 22 (step S204).

The candidate selection unit 25 selects one synthetic map candidate from the synthetic map candidates based on the tracking rates of the synthetic map candidates calculated by the performance calculation unit 24 (step S205).

The localization unit 3 performs localization of the mobile body 10 based on the synthetic map candidate selected by the candidate selection unit 25 (step S206).

Figure 9:
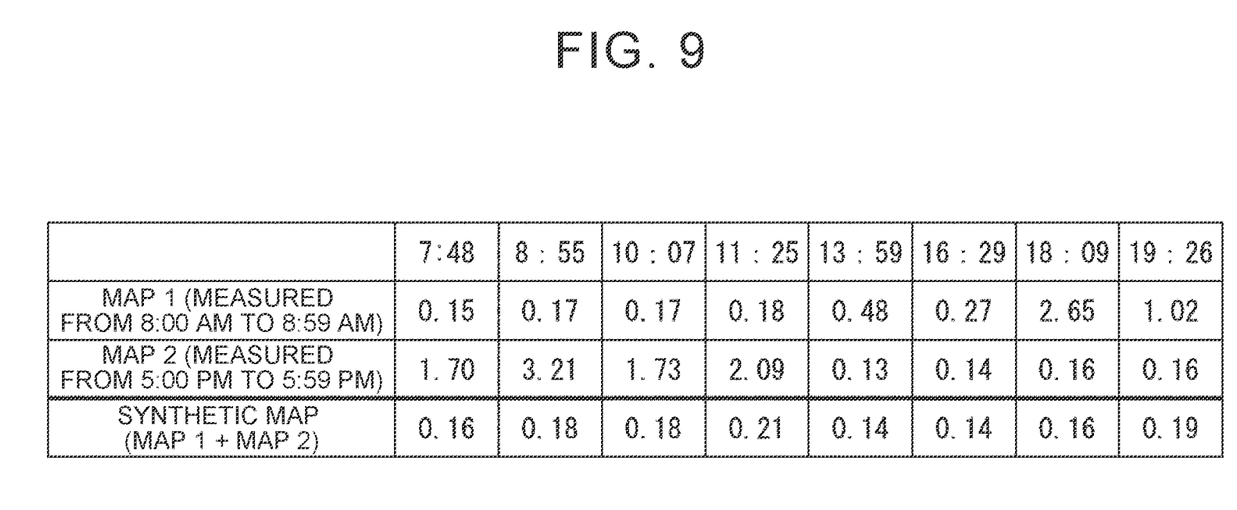
FIG. 9 is a diagram showing evaluation results of localization accuracy by the localization system according to the present embodiment.

Subsequently, evaluation of the localization accuracy by the localization system 1 according to the present embodiment is performed as follows, and the results will be described. In this evaluation, mapping and test data sets are measured while the time zone is changed from morning to night, and the localization accuracy with respect to changes in sunshine conditions is evaluated.

As a result of synthesizing the map shown in FIG. 6 for the map group created from the mapping data set, the combination of the maps measured from 8:00 AM to 8:59 AM and from 5:00 PM to 5:59 PM is selected as the optimum combination. FIG. 9 shows the maximum localization error when the data set for each time is fed to the synthesized synthetic map candidate and the synthetic map candidate that was measured at the time when the map was synthesized.

In the map before synthesis, the localization accuracy tends to deteriorate when the time at which the map is created differs from the time at which the test is performed. On the other hand, for the synthetic map, the accuracy of localization is well maintained in any time zone. From these results, it can be confirmed that the localization system 1 capable of stably performing localization even under various sunshine conditions has been constructed.

As described above, with the localization system 1 according to the present embodiment, it is possible to generate a highly accurate map corresponding to changes in the sunshine conditions depending on the time of day, and it is possible to perform a more highly accurate localization based on the generated map. That is, the map accuracy can be improved, and the localization accuracy can be improved.

While several embodiments of the disclosure have been described, these embodiments have been presented by way of example and are not intended to limit the scope of the disclosure. These novel embodiments can be embodied in various other forms, and various omissions, replacements, and modifications can be made without departing from the scope of the disclosure. These embodiments and modifications thereof are included in the scope and gist of the disclosure, and are included in the scope of the disclosure described in the claims and equivalents thereof.

The present disclosure can also be realized, for example, by causing a processor to execute computer programs for the processes shown in FIGS. 7 and 8.

The programs are stored using various types of non-transitory computer readable media and can be supplied to a computer. The non-transitory computer-readable media include various types of tangible storage media. Examples of non-transitory computer-readable media include a magnetic recording media (for example, a flexible disc, a magnetic tape, a hard disk drive), a magneto-optical recording media (for example, a magneto-optical disc), a CD-ROM (read only memory), a CD-R, a CD-R/W, a semiconductor memory (for example, a mask ROM, a programmable ROM (PROM), an erasable PROM (EPROM), a flash ROM, a random access memory (RAM).

Further, the programs may also be supplied to a computer by various types of transitory computer-readable media. Examples of the transitory computer-readable media include electrical signals, optical signals, and electromagnetic waves. The transitory computer-readable media can supply the programs to a computer via a wired communication path such as an electric wire and an optical fiber, or a wireless communication path.

Each unit that configures the localization system 1 according to each embodiment described above is not only realized by a program. A part or all of each unit that configures the localization system 1 can be implemented by a dedicated hardware such as an application specific integrated circuit (ASIC) and a field-programmable gate array (FPGA).

What is claimed is:

1. A localization system comprising:
a central processing unit that:
acquires map data for map creation in a plurality of different time periods;
creates maps based on the map data acquired, and combines the created maps to create a plurality of synthetic map candidates;
calculates a performance value of each of the synthetic map candidates created;
selects one synthetic map candidate from among the plurality of synthetic map candidates based on the performance value of the synthetic map candidate calculated; and
performs localization of a mobile body based on the synthetic map candidate selected, wherein:
the central processing unit calculates a self-location tracking rate during movement of the mobile body, as the performance value of each of the map candidates,
the mobile body comprises an autonomous mobile robot that is caused to autonomously travel in accordance with a self-location of the mobile body, and
the central processing unit is configured to gradually increase the number of map combinations starting from 2 (N=2), and when an average value of the tracking rates of the synthetic map candidates reaches a predetermined value, the central processing unit is configured to output the reached synthetic map candidate.

2. The localization system according to claim 1, wherein:
(1) the central processing unit creates the plurality of synthetic map candidates by combining N number of maps at a time;
(2) the central processing unit calculates the performance value of each of the synthetic map candidates created;
(3) the central processing unit selects a synthetic map candidate having the highest performance value from among the plurality of created synthetic map candidates, and determines whether the performance value of the selected synthetic map candidate is equal to or less than the predetermined value;
when the central processing unit determines that the performance value of the synthetic map candidate is equal to or less than the predetermined value, N=N+1 is obtained;
the central processing unit repeats the processes (1), (2), and (3), respectively; and
when the central processing unit determines that the performance value of the synthetic map candidate is greater than the predetermined value, the central processing unit synthesizes the maps of the synthetic map candidates, and outputs the synthesized synthetic map candidate.

3. The localization system according to claim 1, wherein:
the central processing unit calculates performance values of the synthetic map candidates for each of the time periods for each synthetic map candidates, and calculates the average value of the calculated performance values; and
the central processing unit selects one synthetic map candidate from among the plurality of synthetic map candidates based on the average value of the performance values of the synthetic map candidates calculated.

4. The localization system according to claim 3, wherein the central processing unit calculates the average value of the performance values by multiplying the performance value for a predetermined time period among the performance values of the synthetic map candidates for each of the time periods by a weighting factor.

5. The localization system according to claim 1, wherein the central processing unit sets a better one of performance values of the maps to combine relative to a closest time period of acquiring the map data when creating the synthetic map candidate, as the performance value of the synthetic map candidate.

6. The localization system according to claim 1, wherein the central processing unit acquires the map data for map creation in a plurality of different time periods and locations.

7. The localization system according to claim 1, wherein the central processing unit:
acquires performance data for calculating the performance value, and
calculates the performance value of each of the map candidates based on the performance data acquired.

8. The localization system according to claim 7, wherein the central processing unit estimates the self-location based on acquiring sensor information of the mobile body to determine a three dimensional conversion value of a point group location.

9. The localization system according to claim 1, wherein the central processing unit causes the autonomous mobile robot to move based on the self-location.

10. A localization method comprising:
a step of acquiring map data for map creation in a plurality of different time periods;
a step of creating maps based on the map data and combining the created maps to create a plurality of synthetic map candidates;
a step of calculating a performance value of each of the created synthetic map candidates;
a step of selecting one synthetic map candidate from among the plurality of synthetic map candidates based on the calculated performance value of the synthetic map candidate;
a step of performing localization of a mobile body based on the selected synthetic map candidate;
a step of calculating a self-location tracking rate during movement of the mobile body, as the performance value of each of the map candidates; and
a step of gradually increasing the number of map combinations starting from 2 (N=2), and when an average value of the tracking rates of the synthetic map candidates reaches a predetermined value, the central processing unit is configured to output the reached synthetic map candidate, wherein
the mobile body comprises an autonomous mobile robot that is caused to autonomously travel in accordance with a self-location of the mobile body.

11. A non-transitory storage medium that stores a program that causes a computer to execute:
a process of acquiring map data for map creation in a plurality of different time periods;
a process of creating maps based on the acquired map data, and combining the created maps to create a plurality of synthetic map candidates;
a process of calculating a performance value of each of the created synthetic map candidates;
a process of selecting one synthetic map candidate from among the plurality of synthetic map candidates based on the calculated performance value of the synthetic map candidate;
a process of performing localization of a mobile body based on the selected synthetic map candidate;
a process of calculating a self-location tracking rate during movement of the mobile body, as the performance value of each of the map candidates; and
a process of gradually increasing the number of map combinations starting from 2 (N=2), and when an average value of the tracking rates of the synthetic map candidates reaches a predetermined value, the central processing unit is configured to output the reached synthetic map candidate, wherein
the mobile body comprises an autonomous mobile robot that is caused to autonomously travel in accordance with a self-location of the mobile body.

12. A map generation device comprising:
a central processing unit that:
acquires map data for map creation in a plurality of different time periods;
creates maps based on the map data acquired, and combines the created maps to create a plurality of synthetic map candidates;
calculates a performance value of each of the synthetic map candidates created; and
selects one synthetic map candidate from among the plurality of synthetic map candidates based on the performance value of the synthetic map candidate calculated, wherein:
the central processing unit calculates a self-location tracking rate during movement of a mobile body, as the performance value of each of the map candidates,
the mobile body comprises an autonomous mobile robot that is caused to autonomously travel in accordance with a self-location of the mobile body, and
the central processing unit is configured to gradually increase the number of map combinations starting from 2 (N=2), and when an average value of the tracking rates of the synthetic map candidates reaches a predetermined value, the central processing unit is configured to output the reached synthetic map candidate.

* * * * *